(12) United States Patent
Sung et al.

(10) Patent No.: US 9,355,682 B2
(45) Date of Patent: May 31, 2016

(54) APPARATUS AND METHOD FOR SEPARATELY VIEWING MULTIMEDIA CONTENT DESIRED BY A USER

(75) Inventors: Ju-Yun Sung, Seoul (KR); Hee-Jeong Choo, Gyeonggi-do (KR); Keum-Koo Lee, Gyeonggi-do (KR); Ji-Young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 187 days.

(21) Appl. No.: 12/915,965

(22) Filed: Oct. 29, 2010

(65) Prior Publication Data
US 2011/0106879 A1 May 5, 2011

(30) Foreign Application Priority Data
Oct. 30, 2009 (KR) ........................ 10-2009-0104527

(51) Int. Cl.
*G06F 15/16* (2006.01)
*H04N 7/025* (2006.01)
*H04N 7/10* (2006.01)
(Continued)

(52) U.S. Cl.
CPC ........ *G11B 27/105* (2013.01); *G06F 17/30817* (2013.01); *G06Q 50/10* (2013.01); *G11B 27/034* (2013.01); *H04L 29/06462* (2013.01); *H04L 65/4084* (2013.01); *H04N 13/0066* (2013.01); *H04N 21/235* (2013.01); *H04N 21/2353* (2013.01); *H04N 21/4756* (2013.01); *H04N 21/8133* (2013.01); *H04N 21/84* (2013.01); *G06F 17/30858* (2013.01); *G06F 17/30908* (2013.01)

(58) Field of Classification Search
CPC .................... G06F 17/30817; G06F 17/30858; G06F 17/30908; H04L 29/06462; H04L 65/4084; H04N 21/235; H04N 13/0066; H04N 21/84; H04N 21/2353; H04N 21/4756; H04N 21/8133; G11B 27/034; G11B 27/105; G06Q 50/10
USPC ........................ 709/203, 231, 246; 725/32, 34
See application file for complete search history.

(56) References Cited

U.S. PATENT DOCUMENTS

| | | | |
|---|---|---|---|
| 5,109,482 A | 4/1992 | Bohrman | |
| 5,329,320 A | * 7/1994 | Yifrach | 348/738 |

(Continued)

FOREIGN PATENT DOCUMENTS

| | | |
|---|---|---|
| CN | 1647528 | 7/2005 |
| CN | 101373476 | 2/2009 |

(Continued)

OTHER PUBLICATIONS

David Bargeron et al., "Annotations for Streaming Video on the Web: System Design and Usage Studies", Computer Networks, vol. 31, May 17, 1999.

(Continued)

*Primary Examiner* — Daniel C Murray
(74) *Attorney, Agent, or Firm* — The Farrell Law Firm, P.C.

(57) ABSTRACT

An apparatus and method for reproducing multimedia content are provided. Content selected through user input unit is reproduced, and if it is requested that part of the reproduced content be registered as content of interest, metadata about the part of the reproduced content is generated and stored using metadata about the reproduced content. The generated metadata is generated and stored as metadata of interest about the content of interest according to input of a user input unit.

10 Claims, 4 Drawing Sheets

(51) Int. Cl.
   *G11B 27/10*   (2006.01)
   *G06F 17/30*   (2006.01)
   *H04L 29/06*   (2006.01)
   *H04N 21/84*   (2011.01)
   *H04N 21/235*  (2011.01)
   *H04N 13/00*   (2006.01)
   *G06Q 50/10*   (2012.01)
   *H04N 21/475*  (2011.01)
   *H04N 21/81*   (2011.01)
   *G11B 27/034*  (2006.01)

(56) References Cited

U.S. PATENT DOCUMENTS

| | | | |
|---|---|---|---|
| 5,414,808 A * | 5/1995 | Williams | 715/723 |
| 5,467,288 A * | 11/1995 | Fasciano et al. | 715/716 |
| 5,973,723 A * | 10/1999 | DeLuca | 725/34 |
| 6,119,154 A * | 9/2000 | Weaver et al. | 709/219 |
| 6,125,229 A * | 9/2000 | Dimitrova et al. | 386/243 |
| 6,137,544 A * | 10/2000 | Dimitrova et al. | 348/700 |
| 6,272,566 B1 * | 8/2001 | Craft | 710/53 |
| 6,285,361 B1 * | 9/2001 | Brewer et al. | 715/723 |
| 6,289,346 B1 * | 9/2001 | Milewski et al. | |
| 6,321,024 B1 * | 11/2001 | Fujita et al. | 386/281 |
| 6,332,144 B1 * | 12/2001 | deVries et al. | |
| 6,332,147 B1 * | 12/2001 | Moran et al. | 715/203 |
| 6,360,234 B2 * | 3/2002 | Jain et al. | 715/201 |
| 6,404,978 B1 * | 6/2002 | Abe | 386/281 |
| 6,519,603 B1 * | 2/2003 | Bays et al. | |
| 6,549,922 B1 * | 4/2003 | Srivastava et al. | |
| 6,551,357 B1 * | 4/2003 | Madduri | 715/235 |
| 6,681,398 B1 * | 1/2004 | Verna | 725/141 |
| 6,754,389 B1 * | 6/2004 | Dimitrova et al. | 382/224 |
| 6,799,298 B2 * | 9/2004 | deVries et al. | 715/233 |
| 6,842,190 B1 * | 1/2005 | Lord et al. | 348/231.5 |
| 6,917,965 B2 * | 7/2005 | Gupta et al. | 709/206 |
| 6,956,593 B1 * | 10/2005 | Gupta et al. | 715/751 |
| 7,051,275 B2 * | 5/2006 | Gupta et al. | 715/201 |
| 7,111,009 B1 * | 9/2006 | Gupta et al. | 369/30.08 |
| 7,131,059 B2 * | 10/2006 | Obrador | 715/209 |
| 7,143,353 B2 * | 11/2006 | McGee et al. | 715/723 |
| 7,149,755 B2 * | 12/2006 | Obrador | |
| 7,162,690 B2 * | 1/2007 | Gupta et al. | 715/202 |
| 7,274,864 B2 * | 9/2007 | Hsiao et al. | 386/241 |
| 7,280,738 B2 * | 10/2007 | Kauffman et al. | 386/281 |
| 7,320,134 B1 * | 1/2008 | Tomsen et al. | 725/32 |
| 7,320,137 B1 * | 1/2008 | Novak et al. | 725/134 |
| 7,506,262 B2 * | 3/2009 | Gupta et al. | 715/751 |
| 7,540,011 B2 * | 5/2009 | Wixson et al. | 725/32 |
| 7,616,946 B2 * | 11/2009 | Park et al. | 455/414.1 |
| 7,735,104 B2 * | 6/2010 | Dow et al. | 725/52 |
| 7,777,121 B2 * | 8/2010 | Asano | 84/600 |
| 7,793,212 B2 * | 9/2010 | Adams et al. | 715/233 |
| 7,836,473 B2 * | 11/2010 | Tecot et al. | 725/78 |
| 7,844,820 B2 * | 11/2010 | Martinez | 713/176 |
| 7,870,475 B2 * | 1/2011 | Schachter | 715/206 |
| 8,005,841 B1 * | 8/2011 | Walsh et al. | 707/739 |
| 8,082,504 B1 * | 12/2011 | Tischer | 715/720 |
| 8,103,646 B2 * | 1/2012 | Brown | 707/705 |
| 8,122,474 B2 * | 2/2012 | Tecot et al. | 725/80 |
| 8,161,387 B1 * | 4/2012 | Tischer | 715/720 |
| 8,166,305 B2 * | 4/2012 | Martinez | 713/176 |
| 8,191,103 B2 * | 5/2012 | Hofrichter et al. | 725/142 |
| 8,209,397 B2 * | 6/2012 | Ahn et al. | 709/217 |
| 8,214,463 B2 * | 7/2012 | Ahn et al. | 709/219 |
| 8,214,519 B2 * | 7/2012 | Ahn et al. | 709/231 |
| 8,224,925 B2 * | 7/2012 | Ahn et al. | 709/217 |
| 8,413,182 B2 * | 4/2013 | Bill | 725/34 |
| 8,451,380 B2 * | 5/2013 | Zalewski | 348/588 |
| 8,495,675 B1 * | 7/2013 | Philpott et al. | 725/34 |
| 8,566,865 B2 * | 10/2013 | Zalewski et al. | 725/34 |
| 8,646,002 B2 * | 2/2014 | Lee | G06F 17/30053 725/105 |
| 8,676,900 B2 * | 3/2014 | Yruski | G06Q 30/02 705/14.1 |
| 8,683,538 B2 * | 3/2014 | Tucker | H04N 7/162 725/113 |
| 8,745,657 B2 * | 6/2014 | Chalozin et al. | 725/32 |
| 8,745,660 B2 * | 6/2014 | Bill | 725/34 |
| 8,751,607 B2 * | 6/2014 | Jenkins | G06F 17/30861 709/219 |
| 8,843,957 B2 * | 9/2014 | Lemire et al. | 725/36 |
| 2001/0044808 A1 * | 11/2001 | Milewski et al. | 707/204 |
| 2002/0069218 A1 * | 6/2002 | Sull et al. | 707/501.1 |
| 2002/0100041 A1 * | 7/2002 | Rosenberg et al. | 725/32 |
| 2002/0112249 A1 * | 8/2002 | Hendricks et al. | 725/136 |
| 2002/0184195 A1 * | 12/2002 | Qian | G06F 17/30867 |
| 2003/0028873 A1 * | 2/2003 | Lemmons | 725/36 |
| 2003/0061369 A1 * | 3/2003 | Aksu | H04L 29/06027 709/231 |
| 2003/0177503 A1 * | 9/2003 | Sull et al. | 725/112 |
| 2004/0194123 A1 * | 9/2004 | Fredlund et al. | 725/9 |
| 2004/0194127 A1 * | 9/2004 | Patton et al. | 725/32 |
| 2004/0194128 A1 * | 9/2004 | McIntyre | H04N 5/272 725/32 |
| 2005/0005289 A1 * | 1/2005 | Adolph | G11B 27/304 725/32 |
| 2005/0149557 A1 * | 7/2005 | Moriya et al. | 707/104.1 |
| 2005/0251832 A1 * | 11/2005 | Chiueh | 725/62 |
| 2006/0026628 A1 * | 2/2006 | Wan et al. | 725/32 |
| 2006/0085826 A1 * | 4/2006 | Funk | H04N 7/17318 725/87 |
| 2006/0294538 A1 * | 12/2006 | Li et al. | 725/24 |
| 2007/0015457 A1 * | 1/2007 | Krampf | H03J 1/0025 455/3.06 |
| 2007/0055985 A1 * | 3/2007 | Schiller et al. | 725/34 |
| 2007/0078904 A1 * | 4/2007 | Yoon | G06F 17/3089 |
| 2007/0083762 A1 * | 4/2007 | Martinez | 713/176 |
| 2007/0094082 A1 * | 4/2007 | Yruski | G06Q 30/02 705/14.56 |
| 2007/0226761 A1 * | 9/2007 | Zalewski et al. | 725/32 |
| 2008/0036917 A1 | 2/2008 | Pascarella et al. | |
| 2008/0040741 A1 * | 2/2008 | Matsumoto | 725/32 |
| 2008/0046920 A1 * | 2/2008 | Bill | 725/34 |
| 2008/0065691 A1 * | 3/2008 | Suitts et al. | 707/104.1 |
| 2008/0071837 A1 * | 3/2008 | Moriya et al. | 707/104.1 |
| 2008/0134277 A1 * | 6/2008 | Tucker | H04N 7/162 725/133 |
| 2008/0140853 A1 * | 6/2008 | Harrison | H04L 47/10 709/231 |
| 2008/0141134 A1 * | 6/2008 | Miyazaki et al. | 715/716 |
| 2008/0155627 A1 | 6/2008 | O'Connor et al. | |
| 2008/0269931 A1 * | 10/2008 | Martinez | 700/94 |
| 2009/0049115 A1 * | 2/2009 | Jenkins | G06Q 20/123 709/202 |
| 2009/0055006 A1 * | 2/2009 | Asano | 700/94 |
| 2009/0083788 A1 * | 3/2009 | Russell | G06Q 30/02 725/34 |
| 2009/0094637 A1 * | 4/2009 | Lemmons | 725/32 |
| 2009/0157753 A1 * | 6/2009 | Lee | G06F 17/30053 |
| 2009/0172724 A1 * | 7/2009 | Ergen et al. | 725/32 |
| 2009/0199230 A1 * | 8/2009 | Kumar et al. | 725/32 |
| 2009/0288112 A1 * | 11/2009 | Kandekar et al. | 725/32 |
| 2009/0300508 A1 * | 12/2009 | Krampf | H04B 1/20 715/739 |
| 2009/0313654 A1 * | 12/2009 | Paila et al. | 725/32 |
| 2009/0327346 A1 * | 12/2009 | Teinila et al. | 707/104.1 |
| 2010/0169786 A1 * | 7/2010 | O'Brien | G06F 17/30817 715/738 |
| 2011/0001758 A1 * | 1/2011 | Chalozin et al. | 345/619 |
| 2011/0016487 A1 * | 1/2011 | Chalozin et al. | 725/35 |
| 2011/0184964 A1 * | 7/2011 | Li | 707/756 |
| 2011/0271116 A1 * | 11/2011 | Martinez | 713/176 |
| 2011/0314493 A1 * | 12/2011 | Lemire et al. | 725/32 |
| 2012/0272262 A1 * | 10/2012 | Alexander et al. | 725/32 |
| 2012/0317302 A1 * | 12/2012 | Silvestri et al. | 709/231 |
| 2013/0185749 A1 * | 7/2013 | Bill | 725/32 |
| 2014/0040944 A1 * | 2/2014 | Zalewski et al. | 725/32 |
| 2014/0130084 A1 * | 5/2014 | Zalewski | H04N 5/147 725/32 |
| 2014/0196085 A1 * | 7/2014 | Dunker et al. | 725/36 |
| 2014/0380355 A1 * | 12/2014 | Hellier et al. | 725/32 |

(56) References Cited

U.S. PATENT DOCUMENTS

| | | | |
|---|---|---|---|
| 2015/0007218 A1* | 1/2015 | Neumann et al. | 725/32 |
| 2015/0128171 A1* | 5/2015 | Zalewski | H04N 5/147 725/32 |
| 2015/0304710 A1* | 10/2015 | Zalewski | H04N 5/147 725/32 |

FOREIGN PATENT DOCUMENTS

| | | | |
|---|---|---|---|
| EP | 1 496 701 | | 1/2005 |
| KR | 1020010073436 | | 8/2001 |
| KR | 1020040108726 | | 12/2004 |
| KR | 1020050114169 | | 12/2005 |
| KR | 1020070061145 | | 6/2007 |
| KR | 100838524 | | 6/2008 |
| KR | 100872708 | | 12/2008 |
| WO | WO 2008/060655 | | 5/2008 |
| WO | WO 2010/019143 | * | 2/2010 |

OTHER PUBLICATIONS

Herng-Yow Chen et al., "A Synchronized and Retrievable Video/HTML Lecture System for Industry Employee Training", Nov. 29, 1999.

European Search Report dated Oct. 20, 2014 issued in counterpart application No. 10827136.

* cited by examiner

APPARATUS AND METHOD FOR SEPARATELY VIEWING MULTIMEDIA CONTENT DESIRED BY A USER

PRIORITY

This application claims priority under 35 U.S.C. §119(a) to an application filed in the Korean Intellectual Property Office on Oct. 30, 2009 and assigned Serial No. 10-2009-0104527, the contents of which are incorporated herein by reference.

BACKGROUND OF THE INVENTION

1. Field of the Invention

The present invention relates generally to a multimedia content reproducing apparatus and method, and more particularly, to an apparatus and method which can separately view only multimedia content desired by a user.

2. Description of the Related Art

With the development of the Internet, users may access the Internet through communication devices such as personal computers, notebook computers, cellular phones, etc. to receive various multimedia content such as sound, images, data, etc. Recently, the multimedia content can be received even by a vehicle or portable Digital Multimedia Broadcasting (DMB) receiver through satellite/terrestrial DMB.

However, to view multimedia content through the Internet, a user has to wait until the multimedia content is buffered by accessing a server in which the content is stored. Further, in order to view a desired scene, a user has to search the desired scene by reproducing the corresponding content from the first or using a Fast Forward (FF) or Rewind (REW) button and has to wait unit the desired scene is buffered.

Therefore, a method which can easily extract and view desired sections or scenes from a plurality of multimedia content is needed.

SUMMARY OF THE INVENTION

An aspect of the present invention is to address at least the above-mentioned problems and/or disadvantages and to provide at least the advantages described below. Accordingly, an aspect of the present invention provides a multimedia reproducing apparatus and method which can separately reproduce only desired scenes from content desired by a user.

Another aspect of the present invention provides a multimedia reproducing apparatus and method which can separately reproduce only desired scenes from content desired by a user by managing metadata about the content desired by the user.

In accordance with an aspect of the present invention, a method for reproducing multimedia content, provided through the Internet, includes reproducing content selected through user input unit, if it is requested that part of the reproduced content be registered as content of interest, generating and storing metadata about the part of the reproduced content, using metadata about the reproduced content, and re-constructing metadata which is generated with respect to a plurality of content of interest as metadata of interest according to input of the user input unit and storing the metadata of interest.

In accordance with another aspect of an embodiment of the present invention, an apparatus for reproducing multimedia content provided through the Internet includes a user input unit for receiving reproduction information about multimedia content and information about parts desired to be managed as content of interest out of currently reproduced content, a metadata generator for generating information about the content of interest selected by the user input unit as metadata and re-constructing metadata which is generated with respect to a plurality of the content of interest as metadata of interest, a metadata storage unit for storing the metadata generated from the metadata generator and the metadata of interest, a content reproducing unit for confirming the metadata of interest in the metadata storage unit and controlling the content of interest to be reproduced according to the metadata of interest, when a request that the content of interest be reproduced is received through the user input unit, and a display unit for displaying the content of interest which is reproduced by the control of the content reproducing unit so that a user can view the content of interest.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Figure 1:
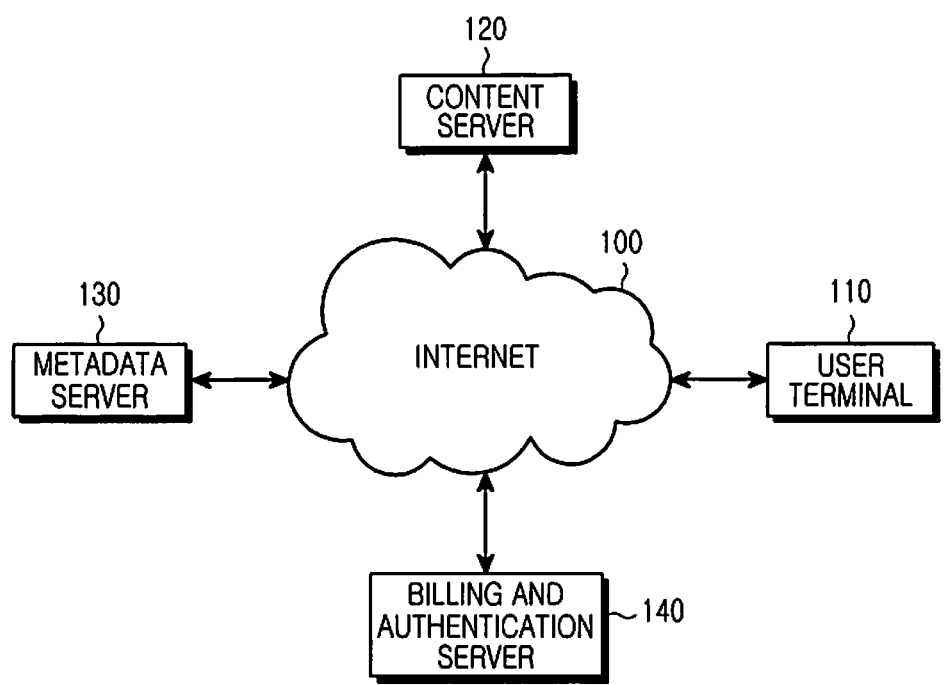
FIG. 1 is a diagram illustrating an entire construction of a content providing system according to an embodiment of the present invention.

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Generally, various multimedia content, such as moving picture content, provided on a website, is transmitted to a user terminal in the form of a streaming service in order to provide a real-time service. Accordingly, if a user desires to re-view a specific image section or scene while viewing multimedia content, the user should download the whole multimedia content or manipulate the seek bar of the user terminal while viewing the multimedia content.

To solve such inconvenience, an embodiment of the present invention provides a multimedia content reproducing method in which information about image sections or scenes (hereinafter, "sections of interest") that a user desires to re-view out of a plurality of multimedia content is registered and if the user requests that the sections of interest be reproduced, previously registered sections of interest (hereinafter, "content of interest") can be successively reproduced or selectively reproduced, based on the section of interest information.

To register the sections of interest, a user terminal may use various terminals such as a cellular phone, a Personal Digital Assistant (PDA), a Portable Media Player (PMP), a notebook computer, a palmtop etc., which can reproduce multimedia content. The user terminal includes a client program to register and store the sections of interest.

The client program is configured to successively reproduce a plurality of content of interest or selectively reproduce at least one content of interest, according to a reproduction request through the user terminal.

If a user employs a plurality of user terminals, section of interest information which is registered through the user terminals may be uploaded on a prescribed website joined as a member and other users authenticated through the website may browse sections of interest by accessing the website.

In an embodiment of the present invention, the section of interest information may include information about location, storage region, use rights etc. of content of interest so that the content of interest can be reproduced through download from a website in a streaming form without being directly stored in the user terminal. The section of interest information may be comprised of metadata.

The client program may be configured so as to reproduce content of interest after directly storing a plurality of multimedia content in a user terminal and registering a plurality of section of interest information about the plurality of stored multimedia content.

In an embodiment of the present invention, if the section of interest information is managed on a predetermined website, content of interest can be reproduced using a general terminal in which the client program is not installed. In this case, the website which manages the section of interest information extracts only content of interest from multimedia content and provides the content of interest to the user terminal in the form of a streaming service.

It is assumed in an embodiment of the present invention that the section of interest information is comprised of metadata. If the section of interest information can be downloaded in a streaming form through a website, a variety of known data formats can be used.

Metadata refers to data, which is assigned to content according to a predetermined rule in order to efficiently search and use desired information out of a large quantity of information. At least one attribute, such as location and details of content, information about a content maker, right condition of use rights, use condition, and use history, may be recorded in the metadata. Using the metadata, a user can reduce the time spent searching desired content by confirming desired content of interest and directly accessing a server which provides the content of interest.

FIG. 1 is a diagram illustrating an entire construction of a content providing system according to an embodiment of the present invention.

Referring to FIG. 1, the content providing system includes a user terminal 110, a content server 120, a metadata server 130, and a billing and authentication server 140, which are connected to each other through the Internet 100.

User terminal 110 can reproduce desired content by accessing content server 120 through the Internet 100 based on an Internet Protocol (IP).

Content server 120 provides content and a user interface to user terminal 110 so that the user can manage the desired part of content through metadata.

Metadata server 130 provides metadata about content offered to the user to content server 120.

Billing and authentication server 140 performs billing and payment functions for content provided to the user.

Although content server 120, metadata server 130, and billing and authentication server 140 are separately represented in FIG. 1, they may be constructed in one device.

Figure 2:
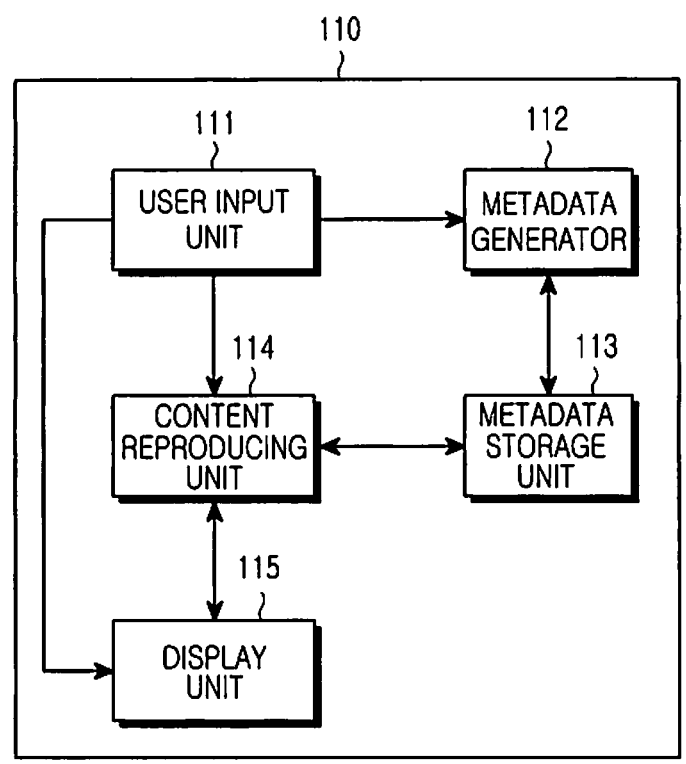
FIG. 2 is a block diagram illustrating a construction of a user terminal according to an embodiment of the present invention.

FIG. 2 is a block diagram illustrating a construction of user terminal 100 according to an embodiment of the present invention.

As illustrated in FIG. 2, user terminal 110 includes a user input unit 111, a metadata generator 112, a metadata storage unit 113, a content reproducing unit 114, and a display unit 115. At least one of the constituent elements, of user terminal 110, may be implemented by a client program. Herein, the term "unit" refers to a hardware device or a combination of hardware and software.

User input unit 111 receives information about play/FF/REW of content from a user and receives time information about the start and end of content desired by the user to be classified as content of interest.

Metadata generator 112 receives information about the content of interest selected by a user from the user input unit 111 and generates metadata about the corresponding information. The metadata is about content of interest and is generated by processing metadata about content offered by content server 120 according to information received from user input unit 111. Metadata generator 112 generates metadata about a plurality of content of interest according to information from user input unit 111 and re-constructs the generated metadata as one metadata (hereinafter, "metadata of interest"). The re-constructed metadata of interest is integrated metadata about content of interest requested by a user so as to successively reproduce multiple content of interest at a time. The metadata of interest includes information about storage location, storage region, type, use rights, etc. of corresponding content.

Metadata storage unit 113 stores the metadata of interest which is generated from and re-constructed in metadata generator 112.

Content reproducing unit 114 confirms, from metadata storage unit 113, metadata about content requested to be reproduced according to input from user input unit 111 and accesses a content server according to the metadata so that corresponding content can be reproduced through user terminal 110. If the requested content is content of interest, content reproducing unit 114 may initially buffer content to be subsequently reproduced while current content is reproduced in order to reproduce content provided by different content servers without discontinuity.

Display unit 115 displays content which is reproduced by the control of content reproducing unit 114, on a screen, so that a user can view the content. Information about content of interest stored by a user as well as the content is displayed on the display unit 115 so that the user can select desired content of interest through user input unit 111 from among a plurality of content of interest.

Figure 3:
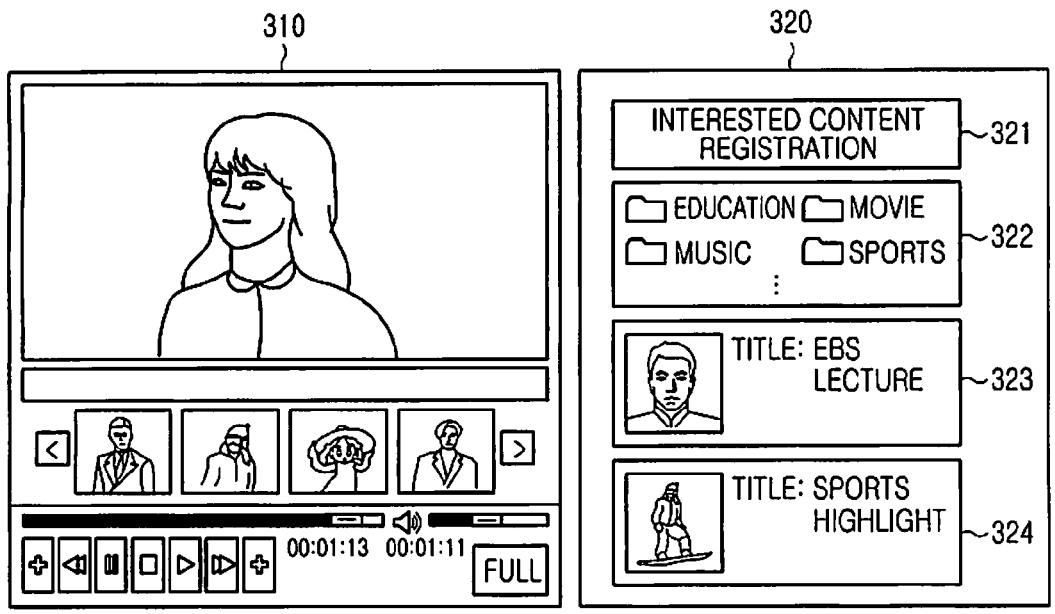
FIG. 3 is a diagram illustrating a user interface screen for registering and reproducing content of interest according to an embodiment of the present invention.

FIG. 3 is a diagram illustrating a user interface screen for registering and reproducing content of interest according to an embodiment of the present invention.

As illustrated in FIG. 3, a user interface includes a screen display region 310 for displaying a content reproducing screen and a metadata display region 320.

Screen display region 310 displays various icons for reproducing content selected from metadata display region 320, such as a screen size control icon, a volume control icon, play time display information, and the like.

Metadata display region 320 may display content of interest lists 323 and 324 selected and stored by a user. Content of interest may be classified by a user and managed as folders as indicated by reference numeral 322. Metadata display region 320 may display content of interest registration icon 321 so as to store a part of currently reproduced content as content of interest. A user can register part of an image displayed on screen display region 310 as the content of interest by clicking the content of interest registration icon 321. Moreover, part of currently reproduced content may be added to an already registered content of interest. An undesired part may be deleted from the registered content of interest and to this end, metadata display region 320 may include a content of interest delete icon (not shown).

Figure 4:
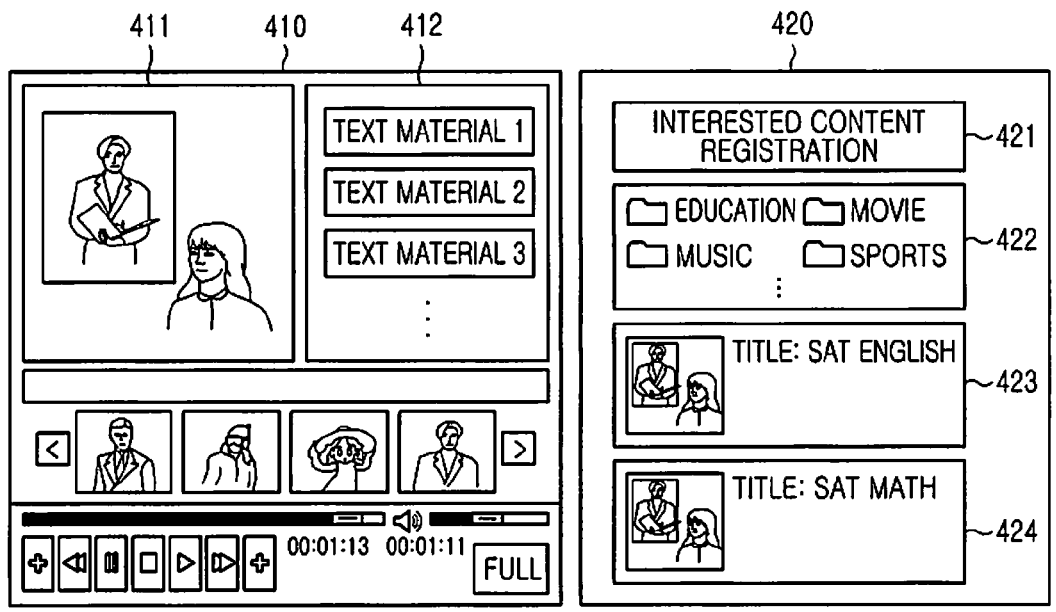
FIG. 4 is a diagram illustrating a user interface screen for registering and reproducing content of interest according to another embodiment of the present invention.

FIG. 4 is a diagram illustrating a user interface screen for registering and reproducing content of interest according to another embodiment of the present invention and shows an example applying the present invention to video education content.

As illustrated in FIG. 4, a user interface includes a screen display region 410 for displaying a content reproducing screen and a metadata display region 420.

Metadata display region 420 is constructed similarly to the metadata display region 320 of FIG. 3.

According to characteristics of the video education content, screen display region 410 includes a moving picture display part 411 for displaying moving pictures and a text display part 412 for displaying the content of video lectures as text. Content of interest may be classified by a user and managed as folders as indicated by reference numeral 422. Metadata display region 420 may display content of interest registration icon 421 so as to store a part of currently reproduced content as content of interest. Although a user may register a desired part as content of interest using a scroll bar for video playback, text materials selected by clicking the text materials corresponding to a desired part of a video lecture or through a drag function may be registered together with a video part corresponding to the text materials as content of interest. In this case, main text materials as well as main screens of content may be displayed on content of interest lists 423 and 424 of the metadata display region 420.

Figure 5:
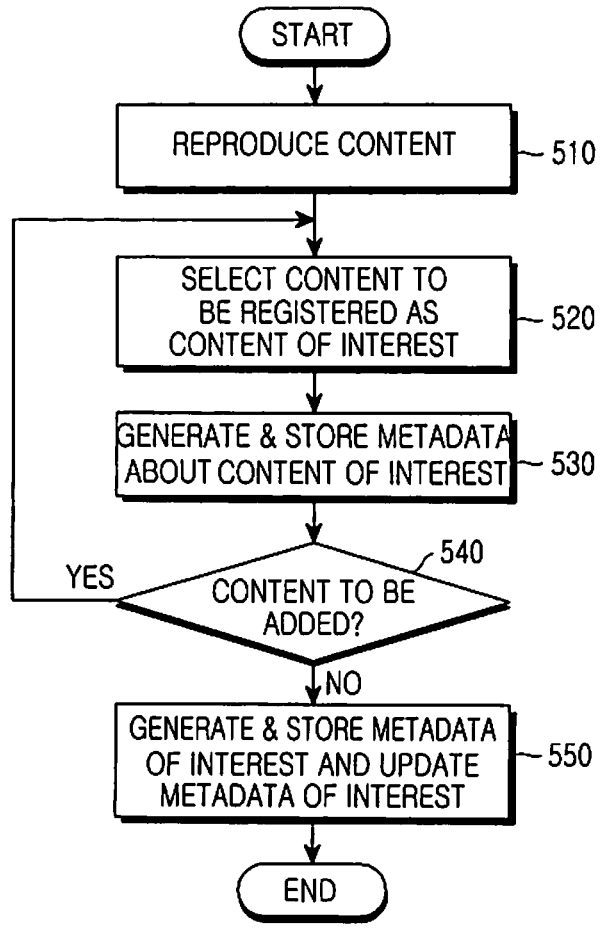
FIG. 5 is a flow chart illustrating a process for registering content of interest in a user terminal according to an embodiment of the present invention.

FIG. 5 is a flow chart illustrating a process for registering content of interests in a user terminal according to an embodiment of the present invention.

Referring to FIG. 5, a user terminal reproduces content selected through a user input unit in step 510. If a request to register part of the currently reproduced content as content of interest is received through the user input unit in step 520, a metadata generator generates metadata about the part of the currently reproduced content using metadata about the currently reproduced content received from a content server and stores the generated metadata in a metadata storage unit in step 530.

In step 540, it is determined whether there is content to be added as content of interest out of the currently reproduced content. If the content to be added is present, steps 520 and 530 are repeated. If no content to be added is present, the generated metadata is stored as metadata of interest about the content of interest or the metadata of interest is updated, by adding the generated metadata in already generated and stored metadata of interest, according to user selection in step 550.

Meanwhile, the metadata of interest generated in step 530 may be stored in a blog etc. of a website rather than the metadata storage unit of a user terminal to share the metadata of interest with users of the website. In this case, the metadata of interest in which information about a section of interest of each content is stored may be generated or a Uniform Resource Identifier (URI) of each section of interest may be generated and stored.

When generating metadata of interest, URI of corresponding content and information about a section of interest within content are included in the metadata of interest. The URI of content denotes a location of the content. In the metadata of interest, information about a start point of a section of interest and a selected section may be stored as byte offset, time, or frame type.

When generating a URI of each section of interest, the URI is generated according to the standard of the World Wide Web Consortium (W3C) media fragment working group.

When metadata of interest is stored in a blog, a user may perform user authentication by accessing the corresponding blog, confirming the content of interest list stored in the blog and selecting the desired content of interest to reproduce the content of interest on the web.

A user may edit the metadata of interest, stored in the blog, after user authentication, to re-construct the metadata of interest in a desired form and may store the re-constructed metadata as a content of interest list. If a user accesses the corresponding blog through user authentication, the user may confirm the stored content of interest list and reproduce the content of interest on the web by selecting the content of interest from the content of interest list.

According to embodiments of the present invention, since only desired scenes of content can be separately reproduced, a user does not need to reproduce content from the beginning in order to reproduce a desired scene of desired content or does not need to wait until the desired scene is buffered using a FF or REW button whenever viewing the corresponding content. Therefore, the user can quickly view the desired scene of the desired content without discontinuity.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method for reproducing a multimedia content, the method comprising:
reproducing a first multimedia content received from a first server;
based on a selection of a first portion of the first multimedia content while reproducing the first multimedia content, generating first metadata including time information about the selected first portion within the first multimedia content and location information of the first multimedia content;
reproducing a second multimedia content received from a second server;
based on a selection of a second portion of the second multimedia content while reproducing the second multimedia content, generating second metadata including time information about the selected second portion within the second multimedia content and location information of the second multimedia content;
generating one integrated metadata including the first metadata and the second metadata;
accessing the first multimedia content stored in the first server and the second multimedia content stored in the second server using the location information included in the one integrated metadata; and buffering the second portion of the second multimedia content while reproducing the first portion of the first multimedia content using the time information about the first portion within the first multimedia content and the time information about the second portion within the second multimedia content.

2. The method of claim 1, wherein the one integrated metadata further includes information for at least one of a content maker, a content type, right condition of use rights, use condition and use history for each of the first portion and the second portion.

3. The method of claim 1, further comprising receiving information about a first text content that corresponds to the first portion.

4. The method of claim 3, wherein the generated one integrated metadata further includes the first text content and a second text content that corresponds to the second portion, if the information about the first text content is received.

5. The method of claim 4, wherein the buffering of the second portion buffers the second portion with the second text content while reproducing the first portion with the first text content using the time information about the first portion within the first multimedia content and the time information about the second portion within the second multimedia content.

6. An apparatus for reproducing a multimedia content, comprising:
a display unit; and
a control unit configured to
reproduce a first multimedia content received from a first server via the display unit,
based on a selection of a first portion of the first multimedia content while reproducing the first multimedia content, generate first metadata including time information about the selected first portion within the first multimedia content and location information of the first multimedia content,
reproduce a second multimedia content received from a second server, based on a selection of a second portion of the second multimedia content while reproducing the second multimedia content,
generate second metadata including time information about the selected second portion within the second multimedia content and location information of the second multimedia content,
generate one integrated metadata including the first metadata and the second metadata,
access the first multimedia content stored in the first server and the second multimedia content stored in the second server using the location information included in the one integrated metadata, and
buffer the second portion of the second multimedia content while reproducing the first portion of the first multimedia content using the time information about the first portion within the first multimedia content and the time information about the second portion within the second multimedia content.

7. The apparatus of claim 6, wherein the one integrated metadata includes information for at least one of a content maker, a content type, right condition of use rights, use condition and use history for each of the first portion and the second portion.

8. The apparatus of claim 6, wherein the control unit is further configured to receive information about a first text content that corresponds to the first portion.

9. The apparatus of claim 8, wherein the control unit is further configured to generate the one integrated metadata further including the first text content and a second text content that corresponds to the second portion, when the information about the first text content is received.

10. The apparatus of claim 9, wherein the control unit is further configured to buffer the second portion with the second text content while reproducing the first portion with the first text content using the time information about the first portion within the first multimedia content and the time information about the second portion within the second multimedia content.

* * * * *